United States Patent

[11] 3,578,218

[72] Inventor Harold Thomas Atwood
 Chicago, Ill. (14152 Irving Ave., Dolton, Ill. 60419)
[21] Appl. No. 804,858
[22] Filed Mar. 6, 1969
[45] Patented May 11, 1971

[54] VACUUM SEAL FOR DOUGH DIVIDERS
 1 Claim, 6 Drawing Figs.
[52] U.S. Cl. .................................................. 222/383,
 417/501, 417/454, 277/165
[51] Int. Cl. ..................................................... B67d 5/40
[50] Field of Search .......................................... 103/153,
 227, (Inquired); 222/409; 417/570, 571, 569,
 (Inquired); 417/501, 454; 222/383, 380; 277/216,
 228; 277/165

[56] References Cited
UNITED STATES PATENTS
| | | | |
|---|---|---|---|
| 1,012,725 | 12/1911 | Shadall | 417/571 |
| 2,110,328 | 3/1938 | Drese | 103/227 |
| 2,709,630 | 5/1955 | Patterson | 277/165 |
| 2,852,324 | 9/1958 | Marien | 277/165X |
| 3,467,448 | 9/1969 | Galle | 277/165X |
| 2,998,781 | 9/1961 | Triebel | 103/227 |

FOREIGN PATENTS
| | | | |
|---|---|---|---|
| 1,083,933 | 9/1967 | Great Britain | 277/165 |

Primary Examiner—Evon C. Blunk
Assistant Examiner—H. S. Lane
Attorney—Benjamin Schlosser ABSTRACT: A vacuum seal is provided in an open top tubular cylinder by a pair of sealing rings mounted respectively on a piston that is reciprocated in the cylinder, and in an annular groove in the upper edge of the cylinder. The sidewall of the cylinder is provided with an inlet opening in flow communication with a hopper from which material, such as dough, for example, is fed into the cylinder above the top of the piston. A metal plate having a flat bottom slides laterally of the cylinder with its flat bottom held in the plane of the open upper end of the cylinder. The metal plate fits against the upper edge of the cylinder and covers its upper end during the downward movement of the piston. The two sealing rings cooperate to seal the cylinder above and below the inlet opening, so that as the piston moves downwardly in the cylinder, it produces sufficient suction to force the dough from the hopper through the inlet opening into the cylinder.

Patented May 11, 1971
3,578,218
2 Sheets-Sheet 1
FIG. 2
FIG. 1
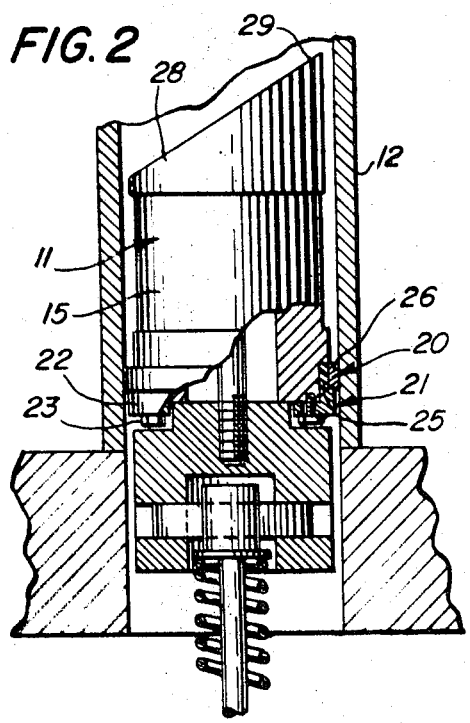
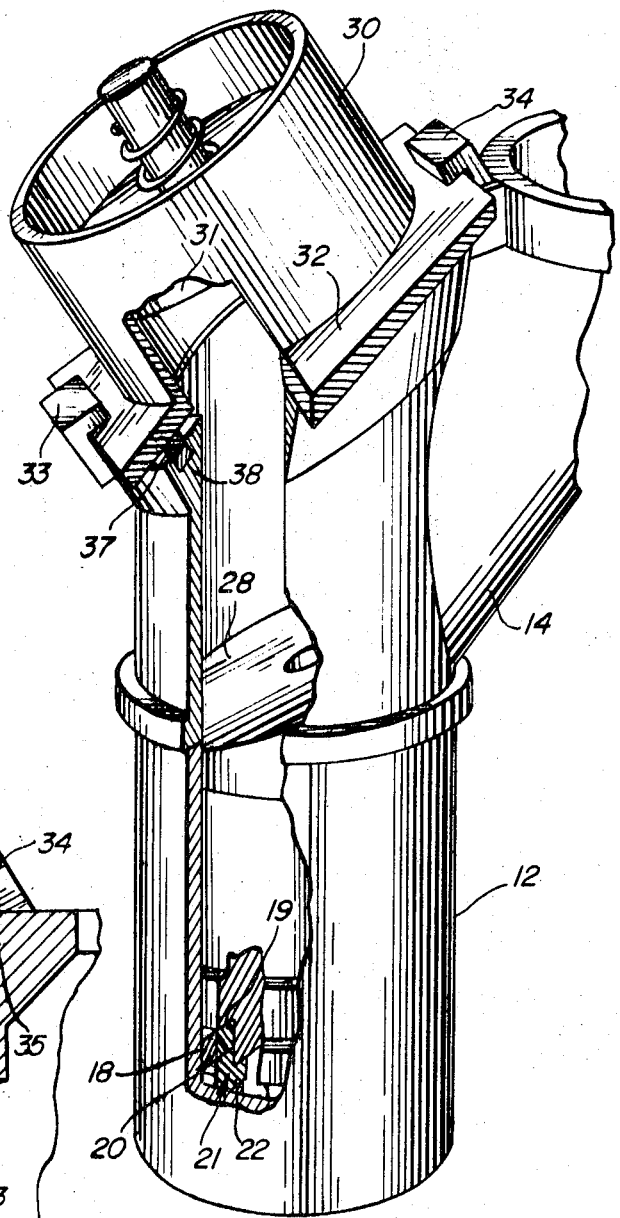
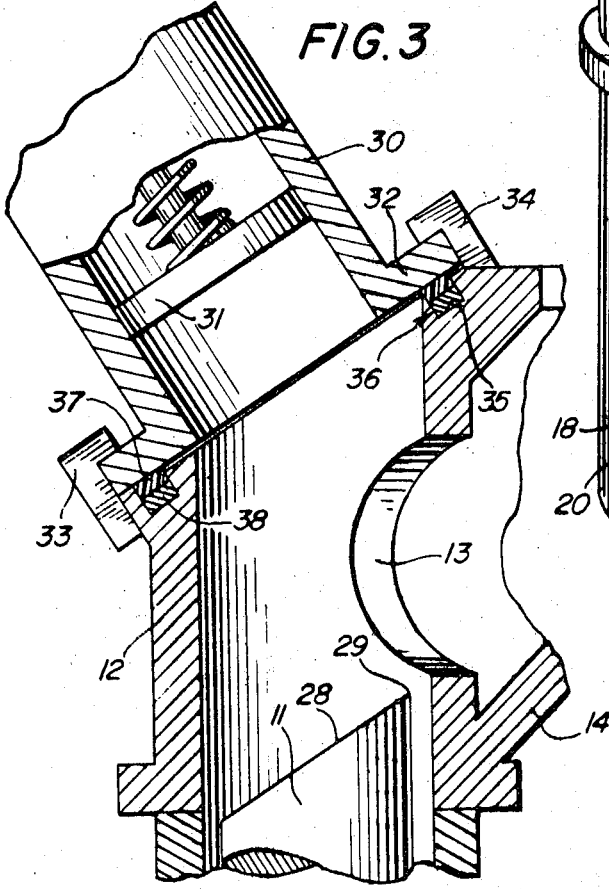
FIG. 3
INVENTOR
HAROLD T. ATWOOD
BY Benjamin Schlosser
ATTORNEY INVENTOR
HAROLD T. ATWOOD
BY Benjamin Schlosser
ATTORNEY

VACUUM SEAL FOR DOUGH DIVIDERS

This invention relates to a vacuum seal for dough dividers of the type disclosed in the Atwood et al. U.S. Pat. No. 3,311,608, and is particularly concerned with means for creating suction strong enough to force dough from the hopper into the tubular cylinder through the sidewall opening of the cylinder. The mechanisms for moving parts of the dough divider structure and portions of the dough divider structure that are not specifically related to the present invention are not described in the following specification, but are fully described in the above identified patent.

In a dough divider constructed in accordance with the present invention, a supply of dough is held in a hopper having a lower open end in register with a sidewall opening in a tubular cylinder. A piston is slidably mounted in the tubular cylinder with its top surface below the lower edge of the sidewall opening in the lowermost position of the piston. As the piston moves downwardly in the cylinder it creates suction to draw the dough into the cylinder. As the piston moves upwardly, it pushes part of the dough from the cylinder into an inverted scaling cup. The scaling cup is mounted on a flat bottom plate that slides over the top of the cylinder to close its upper end when the scaling cup is in its discharge position.

The structure by means of which the above-mentioned and other advantages of the invention are attained will be fully described in the following specification, taken in conjunction with the accompanying drawings showing a preferred illustrative embodiment of the invention, in which:

FIG. 1 is a perspective view of the cylinder structure with parts cut away to show the sealing means:

FIG. 2 is a vertical sectional view of the lower sealing structure;

FIG. 3 is a vertical sectional view of the upper sealing structure;

Figure 4:
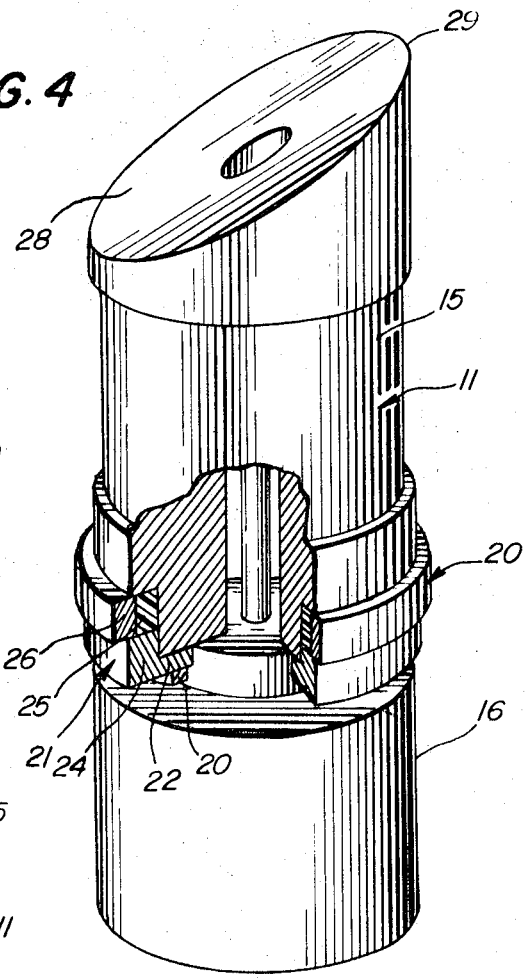
FIG. 4 is a detail perspective view of the piston with portions broken away to show the means for securing the lower sealing ring to the piston.
Figure 5:
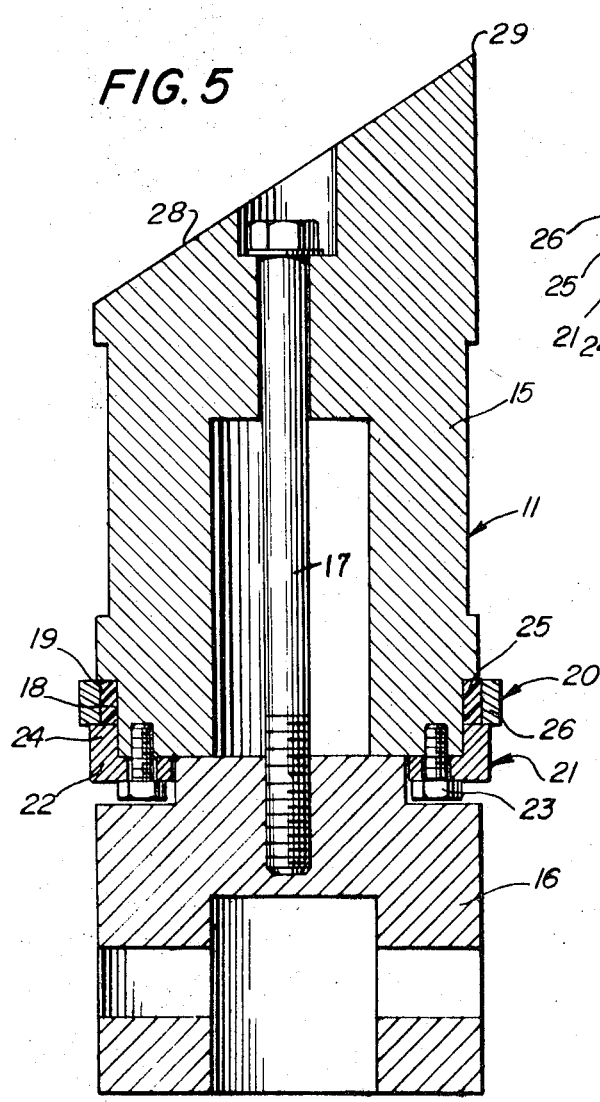
FIG. 5 is a vertical sectional view through the piston and lower seal.
Figure 6:
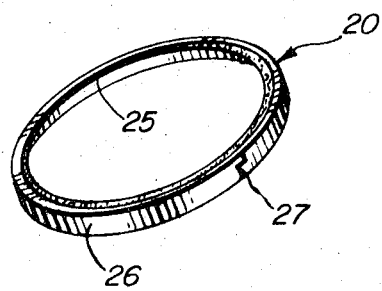
FIG. 6 is a detail perspective view, on a reduced scale, of the lower sealing ring.

In the drawings, a piston 11 is slidably mounted in a tubular cylinder 12. The sidewall of the cylinder 12 has an inlet opening 13 having its lower edge located above the top of the piston when the piston is in its lowermost position. The inlet opening 13 is in flow communication with the open lower end of a hopper 14 adapted to hold a supply of dough. The force of gravity will cause a small quantity of the dough to flow into the cylinder, but the flow is too slow for a commercially successful dough dividing operation. Therefore the flow of the dough is assisted by suction created in the cylinder when the piston is moved downwardly.

The cylinder must be sealed efficiently above and below the inlet opening during the downward movement of the piston to enable the piston to create enough suction to force the dough into the cylinder. The piston comprises an upper portion 15 secured to a lower portion 16 by a screw or bolt 17. The lower end of the upper portion of the piston has an annular recess 18 providing a downwardly directed annular shoulder 19. A sealing ring 20 is seated in the recess 18 with its upper edge pressed against the shoulder 19 by a backup washer 21. The washer 21 comprises a horizontal portion 22 secured to the piston by screws 23, and a vertical flange 24 abutting the lower edge of the sealing ring.

The sealing ring 20 is laminated, and comprises an inner ring 25 of any suitable elastomeric material, such as polyurethane, for example, bonded to an outer metal ring 26 that is preferably cast iron. The metal ring is split, as indicated at 27, so that it can be spread slightly to facilitate mounting it on the piston. The outside diameter of the sealing ring is slightly greater than the outside diameter of the piston. The elasticity of the inner ring permits it to be compressed slightly, and its resiliency insures a tight sealing engagement between the outer surface of the metal ring and the inner wall surface of the cylinder.

The top of the piston 11 is cut at an angle of 45° to provide an inclined top surface 28 with its uppermost edge 29 in vertical alignment with the inlet opening 13. On the upward stroke of the piston, the uppermost edge of the piston moves into engagement with the dough extending through the inlet opening and starts to cut it off adjacent the lowermost edge of the inlet opening. The angle of inclination of the top surface of the piston makes the uppermost edge 29 rather sharp, thus increasing the efficiently of the piston as a cutting element for the dough. The inclined top surface of the piston also guides the dough inwardly of the tubular cylinder as it is cut off from the mass of dough in the hopper. As the piston 11 moves upwardly it pushes some of the dough through the open top of the cylinder into an inverted scaling cup 30. The quantity of dough forced into the scaling cup is limited by a flat disc 31 slidably mounted in the scaling cup. The disc 31 is mounted parallel to the inclined top surface 28 of the piston. The scaling cup is mounted on a flat bottom plate 32. The plate 32 is reciprocated to move the scaling cup into and out of register with the open top of the tubular cylinder.

The plate 32 is held against the top surface of the cylinder, which is also parallel to the top surface of the piston 11, by a pair of guide members 33 and 34. The inclined top surface of the cylinder 12 has an annular groove 35 in which a sealing ring 36 is seated. The sealing ring 36 comprises an upper metal ring 37 and a lower ring 38 of polyurethane or other elastomeric material bonded thereto. The resiliency of the elastomeric ring 38 insures an efficient sealing engagement between the plate 32 and the upper edge of the cylinder 12 when the plate covers the open top of the cylinder. The plate is in position to cover the top of the cylinder, and thus make the seal effective, when the piston is moving downwardly in the cylinder. The inlet opening is completely closed by the dough in the lower end of the hopper.

Although I have described a preferred embodiment of the invention in considerable detail, it will be understood that the description thereof is intended to be illustrative, rather then restrictive, as many details of structure may be modified or changed without departing from the spirit or scope of the invention. Accordingly, I do not desire to be restricted to the exact structure described.

I claim:

1. In combination, a tubular cylinder having an open upper end disposed angularly relative to the axis of said cylinder, a metal plate having a smooth lower surface seated on the upper end of said cylinder, a retainer member engaging opposite edges of said plate to hold it against the upper edge of said cylinder, said plate being movable laterally relative to said cylinder, an annular groove in said angularly disposed upper edge of said cylinder encircling the opening therein, a flat annular elastomeric ring seated in said groove, and a flat annular metal ring having the same inside and outside diameters as the elastomeric ring and seated in said groove on top of said elastomeric ring, said metal ring having a smooth upper surface, said elastomeric ring pressing said metal ring upwardly to form a seal between said cylinder and said plate throughout the flat surface area of said metal ring, a hopper adjacent said cylinder, an inlet opening in the sidewall of said cylinder that is completely covered by material held in said hopper and providing flow communication of said material from said hopper into said cylinder, a piston slidably mounted in said cylinder, and a sealing ring mounted on said piston, said sealing ring comprising a metal strip having a smooth outer surface engaging the inner wall surface of said cylinder and an elastomeric strip bonded to the inner surface of said metal strip, said elastomeric strip pressing the smooth surface of said metal strip into sealing engagement with the inner wall surface of said cylinder, said sealing ring being located below the lower edge of said inlet opening in all positions of said piston, whereby downward movement of said piston in said cylinder creates suction to suck material from said hopper into said cylinder.